Nov. 25, 1958     K. PALMER     2,862,183
COMBINATION SPACING AND CLAMPING DEVICE
Filed Oct. 29, 1954

WITNESSES
Edwin E. Bassler
David M. Schiller

INVENTOR
Karl Palmer
BY C. L. Freedman
ATTORNEY

United States Patent Office 2,862,183
Patented Nov. 25, 1958

2,862,183

COMBINATION SPACING AND CLAMPING DEVICE

Karl Palmer, West Orange, N. J., assignor to Westinghouse Electric Corporation, East Pittsburgh, Pa., a corporation of Pennsylvania Application October 29, 1954, Serial No. 465,568

2 Claims. (Cl. 324—137)

This invention relates to a combination spacing and clamping device and has particular relation to a device for spacing a pair of laminated members and for clamping the laminations of the laminated members together.

Although the invention has many and varied uses, it is employed with particular advantage in electrical instruments which include laminated magnetic structures. For example, in an integrating watthour meter there is included a laminated magnetic structure having a plurality of spaced laminated portions.

In such instruments, predetermined spacing of certain of the laminated portions is extremely desirable and must be maintained for the operating life of the instrument. In addition, it is desirable that the laminations of the laminated parts be securely clamped together to provide a rigid magnetic structure.

In accordance with the invention, a device is provided for spacing a pair of laminated parts and for clamping the laminations thereof together. The device includes a spacer part and a plurality of spaced clamping parts carried by the spacer part for adjustment relative to the spacer part. The spacer part is proportioned for positioning between a pair of spaced laminated parts in a wedged condition to have the clamping parts positioned for clamping engagement with the laminations of the laminated parts in response to adjustment of the clamping parts relative to the spacer part.

In a specific embodiment of the invention, the spacing and clamping device is of one part construction comprising a strip or plate having integrally connected spacer and clamping portions. The plate includes a spacer portion and a plurality of spaced deformable clamping extensions projecting from the spacer portion.

The plate is proportioned to be positioned relative to a pair of laminated parts to have the spacer portion between the laminated parts in a wedged condition with the clamping portions spaced from the laminated parts. The clamping portions are positioned for clamping engagement with the laminations of the laminated parts in response to deformation thereof from the spaced positions.

When employed in connection with electrical instruments, the spacing and clamping plate is preferably constructed of a material having a higher electrical resistivity than the electrical resistivity of material employed in the associated magnetic structure. For example, the spacing and clamping plate may be formed of a commonly available nickel chromium alloy known as Nichrome having an electrical resistivity of approximately 108 microhm-cm. at 20° C. when the plate is employed with a magnetic structure formed of 4% silicon steel having a resistivity of approximately 56 microhm-cm. at 20° C. With such arrangement the losses of the assembly are maintained at a minimum value.

It is, therefore, an object of the invention to provide a device of one-part construction for effecting the dual functions of spacing a pair of laminated parts and clamping the laminations of the laminated parts together.

It is another object of the invention to provide a spacing and clamping device of one-part construction having integrally connected spacing and clamping portions with the clamping portions being of deformable construction.

It is a further object of the invention to provide a device for spacing a plurality of laminated magnetic parts of a magnetic structure of an electrical instrument and for clamping the laminations of the laminated parts together.

It is still another object of the invention to provide an electrical instrument having a pair of spaced laminated magnetic parts with a member formed of material having a substantial electrical resistivity as compared to the resistivity of material employed in the magnetic parts for spacing the laminated parts and clamping the laminations thereof.

Other objects of the invention will be apparent from the following description taken in conjunction with the accompanying drawing, in which.

Figure 1:
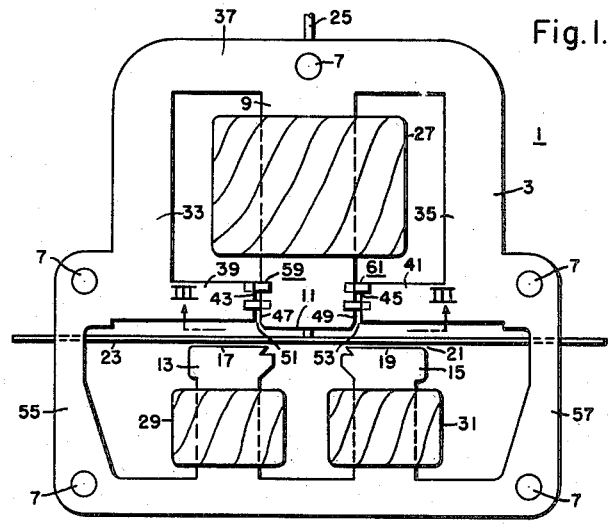
Figure 1 is a view in front elevation of a watthour meter embodying the invention.
Figure 2:
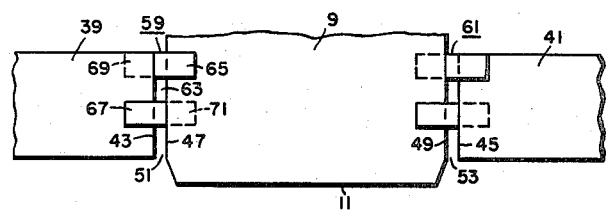
Fig. 2 is an enlarged view in front elevation of a portion of the meter of Fig. 1.

Referring to the drawing, there is illustrated in Fig. 1 a device embodying the teachings of the invention. For purpose of discussion, the device of Fig. 1 is illustrated as comprising an integrating watthour meter represented generally by the numeral 1.

As illustrated in Fig. 1, the meter 1 includes a magnetic structure 3 constructed of a plurality of magnetic laminations 5 each having the configuration illustrated in Fig. 1. The laminations 5 may be formed of any suitable material. For example, the laminations may be formed of a high silicon steel, such as 4% silicon steel having an electrical resistivity of approximately 56 microhm-cm. at 20° C. The laminations 5 are secured together at a number of spaced points by means of suitable rivets or other fastening means 7.

The structure 3 includes a voltage magnetic pole 9 having a voltage pole face 11 and a pair of spaced current poles 13 and 15 having current pole faces 17 and 19, respectively. The pole faces 17 and 19 lie substantially in a common plane which is spaced from and parallel to the plane defined by the pole face 11 to provide an air gap 21. An electroconductive disk 23 is mounted for rotation through the air gap 21 by means of a shaft 25.

In order to effect energization of the magnetic structure 3, a voltage winding 27 surrounds the voltage pole 9 and current windings 29 and 31 surround the current poles 13 and 15. The winding 27 is effective when energized in accordance with an alternating voltage to direct an alternating voltage magnetic flux through the magnetic structure 3. In a similar manner, the current windings 29 and 31 are effective when energized in accordance with an alternating current to direct an alternating-current magnetic flux through the magnetic structure 3. A portion of the voltage flux traverses the air gap 21 to react with a portion of the current flux present in the air gap 21 to establish a shifting magnetic field in the air gap for influencing the disk 23. In order to provide a return magnetic circuit for voltage flux produced by energization of the winding 27, the magnetic structure 3 includes a pair of magnetic arms 33 and 35 arranged in parallel magnetic circuit relation with respect to the voltage pole 9 to carry substantially equal portions of the voltage flux. The voltage pole 9 and the arms 33 and 35 are connected in parallel magnetic circuit relation by means of a magnetic bridge 37. As illustrated in Fig. 1, the arms 33 and 35 include, respectively, magnetic extensions 39 and 41 positioned relative to the voltage pole 9 to divert a portion of the voltage flux away from the air gap 21.

For the purposes of controlling the portion of the voltage flux which is diverted from the air gap 21 to thereby control the portion of active voltage flux which traverses the air gap 21, the magnetic extensions 39 and 41 have respectively end faces 43 and 45 which are spaced from side faces 47 and 49 of the voltage pole 9 to define a pair of control air gaps 51 and 53. With such arrangement a controlled active portion of the voltage flux traverses the air gap 21 and divides equally between the current poles 13 and 15 to return to the voltage pole 9 by way of arms 55 and 57 and the arms 33 and 35. The remaining inactive portion of the voltage flux is shunted away from the air gap 21 by means of the magnetic extensions 39 and 41 to return to the voltage pole 9 through the arms 33 and 35 without traversing the air gap 21.

In order to assure proper operation of the meter 1, it is desirable that a predetermined spacing of the voltage pole 9 and the magnetic extensions 39 and 41 be maintained during the operating life of the meter. It is also desirable that portions of the laminations of the structure 3 which constitute the voltage pole 9 and the extensions 39 and 41 be securely clamped to provide a rigid magnetic structure.

According to the invention, a spacing and clamping device of one-part construction is provided for effecting the dual functions of spacing a pair of laminated parts and clamping the laminations thereof together. In accordance with a specific embodiment of the invention, a pair of spacing and clamping devices of one-part construction are provided with a separate one of the devices being associated with each of the control air gaps 51 and 53. The spacing and clamping devices are represented generally in the drawing by the numerals 59 and 61. Inasmuch as each of the devices 59 and 61 is of identical construction, only one of the devices will be described. For purposes of discussion, only the device 59 will be described in association with the control air gap 51.

Figure 4:
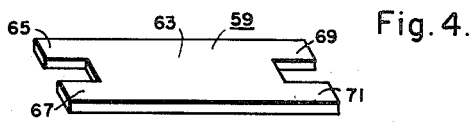
Fig. 4 is a view in perspective of a part of the meter of Fig. 1, showing the part in a condition prior to assembly to the meter of Fig. 1.

Referring now to Fig. 4, there is illustrated the device 59 in the condition prior to assembly thereof relative to the magnetic structure 3. In the specific embodiment of Fig. 4, the device 59 is in the form of a strip or plate having integrally connected spacer and clamping portions. As there shown, the plate 59 includes a central spacer portion 63 and a plurality of spaced clamping extensions 65, 67, 69 and 71 which project from the ends of the portion 63. The plate 59 is conveniently formed as by a stamping operation with a stamping of the desired configuration being formed from a sheet of suitable material. During such operation, the plate 59 is conveniently formed with the portions 63, 65, 67, 69 and 71 thereof lying substantially in a common plane.

According to the invention, the plate 59 is proportioned to permit permanent deformation of the extensions 65, 67, 69 and 71 to effect the desired clamping action, as will be presently described. The plate 59 is preferably proportioned to permit deformation thereof by forces which are substantially greater than forces applied to the plate 59 when the plate is in an operative position relative to the structure 3. The extensions 65, 67, 69 and 71 comprise weakened sections of the plate proportioned for deformation from the positions thereof illustrated in Fig. 4 to permanent clamping positions.

The spacer portion 63 of the plate 59 is proportioned for positioning between the magnetic extension 39 and the voltage pole 9 in a wedged condition so as to maintain the desired spacing of the extension 39 and the voltage pole 9. The extensions 65, 67, 69 and 71 are proportioned to effect the desired clamping of the portions of the laminations 5 constituting parts of the exten-
sion 39 and the voltage pole 9 for a variety of different thicknesses of the magnetic structure 3.

The plate 59 may be formed of any suitable material. Preferably, the plate 59 is constructed of a material having a higher electrical resistivity than the electrical resistivity of the magnetic material employed in the structure 3 which may be of conventional high silicon steel for the purpose of maintaining losses in the structure 3 at a minimum value. A number of materials suitable for the plate 59 are presently available. For example, high resistivity nickel-chromium alloys are presently available. In a preferred embodiment of the invention, the plate 59 is formed of an alloy consisting of approximately 80% nickel and 20% chromium known as Nichrome having an electrical resistivity of approximately 108 microhms-cm. at 20° C.

Figure 3:
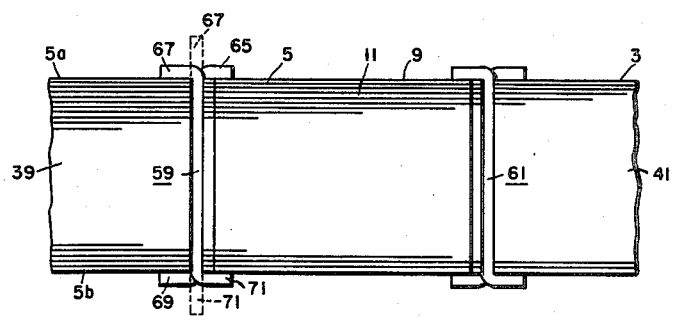
Fig. 3 is an enlarged view taken along the line III—III of Fig. 1.

In order to assemble the plate 59 to the magnetic structure 3, the following operations are performed. The plate 59 is positioned relative to the structure 3 with the portion 63 within the air gap 51 in a wedged condition between the extension 39 and the voltage pole 9, and with the extensions 65, 67, 69, and 71 spaced from the extension 39 and the voltage pole 9 to project along axes extending substantially transverse to the planes defined by the laminations 5. Such positioning of the extensions 65, 67, 69 and 71 is represented in Fig. 3 by the dotted representations of the extensions 67 and 71. With the plate 59 positioned as described, the extensions 65, 67, 69 and 71 are clear of the magnetic structure 3 to permit deformation thereof into permanent positions of clamping engagement with the end laminations 5a and 5b of the magnetic structure 3.

In order to securely clamp portions of the laminations 5 which constitute the extension 39 and the voltage pole 9, the extensions of the plate 59 which extend along a common axis are each deformed from the cleared positions to engage a separate one of the extension 39 and the voltage pole 9. As best shown in Fig. 3, the extensions 67 and 71 are deformed from the cleared positions to have the extension 67 engage the portion of the lamination 5a which constitutes a part of the extension 39 and to have the extension 71 engage the portion of the lamination 5b which constitutes a part of the voltage pole 9. The extension 65 is deformed from the spaced position to engage the portion of the lamination 5a constituting a part of the voltage pole 9 and the extension 69 is deformed to engage the portion of the lamination 5b constituting a part of the extension 39. Any suitable tools may be employed to effect the wedging of the portion 63 between the extension 39 and the voltage pole 9 and to effect the deformation of the several extensions 65, 67, 69 and 71.

Since certain changes may be made in the above apparatus and different embodiments of the invention could be made without departing from the scope thereof, it is intended that all matter contained in the above description or shown in the accompanying drawing shall be interpreted as illustrative and not in a limiting sense.

I claim as my invention:

1. In an electrical meter, a magnetic structure including a voltage magnetic portion formed of a plurality of integral laminations and a current magnetic portion, said voltage portion including a voltage magnetic pole and a pair of magnetic arms connected in parallel magnetic circuit relation with said voltage pole, said voltage pole having a voltage pole face and a pair of side faces, said magnetic arms having end faces with each of the end faces being spaced from a separate one of said side faces, the laminations of said voltage pole and said magnetic arms defining first planes stacked in a direction extending transverse to the direction of spacing of the end faces and side faces, said current portion including a pair of spaced current magnetic poles having current pole faces defining a common plane spaced from the plane of the voltage pole face to define an air gap, voltage winding means surrounding the voltage pole effective when energized to direct an alternating voltage magnetic flux through said air gap and through said magnetic arms in parallel, current winding means surrounding said current poles effective when energized for directing an alternating-current magnetic flux through the air gap to establish with said voltage flux a shifting magnetic field, armature means mounted for rotation through said air gap under the influence of said shifting magnetic field, and means for spacing said magnetic arms and said voltage pole and clamping the laminations thereof, said means comprising a pair of plate members each having a spacer portion and a plurality of spaced deformable integral extensions projecting from the spacer portion, said plate members being positioned relative to the magnetic structure with each of said spacer portions extending transverse to said first planes between the voltage pole and a separate one of the magnetic arms in a wedged condition, and with said extensions extending parallel to said first planes in clamping engagement with end laminations of the voltage pole and the magnetic arms.

2. In an electrical meter, a magnetic structure including a laminated voltage magnetic portion and a current magnetic portion, said voltage portion including a voltage magnetic pole and a pair of magnetic arms connected in parallel magnetic circuit relation with said voltage pole, said voltage pole having a voltage pole face and a pair of side faces, said magnetic arms having end faces with each of the end faces being spaced from a separate one of said side faces, the laminations of said voltage pole and said magnetic arms defining first planes stacked in a direction extending transverse to the direction of spacing of the end faces and side faces, said current portion including a pair of spaced current magnetic poles having current pole faces defining a common plane spaced from the plane of the voltage pole face to define an air gap, voltage winding means surrounding the voltage pole effective when energized to direct an alternating voltage magnetic flux through said air gap and through said magnetic arms in parallel, current winding means surrounding said current poles effective when energized for directing an alternating-current magnetic flux through the air gap to establish with said voltage flux a shifting magnetic field, armature means mounted for rotation through said air gap under the influence of said shifting magnetic field, and means for spacing said magnetic arms and said voltage pole and clamping the laminations thereof, said means comprising a pair of plate members each having a spacer portion and a separate pair of spaced deformable integral extensions projecting from each end of the spacer portion, said plate members being positioned relative to the magnetic structure with each of said spacer portions extending transverse to said first planes between the voltage pole and a separate one of the magnetic arms in a wedged condition, and with each extension of each pair of extensions of each plate in clamping engagement with an end lamination of a separate one of the voltage pole and magnetic arms, each of said plate members being constructed of a material having a higher electrical resistivity than the resistivity of the material employed in the magnetic structure.

References Cited in the file of this patent

UNITED STATES PATENTS

| 2,167,649 | Green | Aug. 1, 1939 |
| 2,350,029 | Glass | May 30, 1944 |

FOREIGN PATENTS

| 11,844 | Great Britain | 1914 |
| 393,310 | Great Britain | June 2, 1933 |
| 440,008 | Great Britain | Dec. 18, 1935 |